(12) United States Patent
Kent et al.

(10) Patent No.: US 7,983,422 B2
(45) Date of Patent: Jul. 19, 2011

(54) QUANTUM CRYPTOGRAPHY

(75) Inventors: Adrian Patrick Kent, Cambridge (GB);
William John Munro, Bristol (GB);
Timothy Paul Spiller, North Somerset
(GB); Raymond G Beausoleil,
Redmond, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2640 days.

(21) Appl. No.: 10/627,158

(22) Filed: Jul. 25, 2003

(65) Prior Publication Data

US 2005/0036624 A1    Feb. 17, 2005

(51) Int. Cl.
*H04L 9/08* (2006.01)
(52) U.S. Cl. ...................................................... 380/278
(58) Field of Classification Search .................... 380/278
See application file for complete search history.

(56) References Cited

U.S. PATENT DOCUMENTS 6,678,450 B1 * 1/2004 Franson ......................... 385/122

OTHER PUBLICATIONS

Bennett et al., "Experimental Quantum Cryptography", Sep. 1991, pp. 1-28, obtained from http://cs.uccs.edu/~cs691/crypto/BBBSS92.pdf.*
Black et al., "Quantum Computing and Communication", Feb. 20, 2002, pp. 1-52, obtained from http://hissa.nist.gov/~black/Papers/quantumCom.pdf, date obtained from http://en.scientificcommons.org/563634.*
Sych et al., "Quantum cryptography with continuous alphabet", Apr. 4, 2003, pp. 1-14, obtained from http://arxiv.org/PS_cache/quant-ph/pdf/0304/0304035v1.pdf.*

Maurer, Ueli M., "Secret Key Agreement by Public Discussion from Common Information", IEEE Transactions on Information Theory, vol. 39, No. 3, May 1993, pp. 733-742.
Bennett, Charles H., et al., "Generalized Privacy Information", IEEE Transactions on Information Theory, vol. 41, No. 6, Nov. 1995, pp. 1915-1923.
Nielsen, Michael, et al., "Quantum Computation and Quantum Information" (Chapter 7), Cambridge University Press (2000), pp. 277-352.
Bennett, C.H., et, al., "Quantum Cryptology and Its Application to Provably Secure Key Expansion, Public-Key Distribution and Coin-Tossing", IEE International Symposium on Information Theory Abstract (1983), p. 91. (This reference provided as substitute for the citation on p. 3, line 11 of the specification which cannot be located).

\* cited by examiner

*Primary Examiner* — Jeffrey D Popham

(57) ABSTRACT

A method of establishing a shared secret random cryptographic key between a sender and a recipient using a quantum communications channel is described. The method comprises: generating a plurality of random quantum states of a quantum entity, each random state being defined by a randomly selected one of a first plurality of bases in Hilbert space, transmitting the plurality of random quantum states of the quantum entity via the quantum channel to a recipient, measuring the quantum state of each of the received quantum states of the quantum entity with respect to a randomly selected one of a second plurality of bases in Hilbert space, transmitting to the recipient composition information describing a subset of the plurality of random quantum states, analysing the received composition information and the measured quantum states corresponding to the subset to derive a first statistical distribution describing the subset of transmitted quantum states and a second statistical distribution describing the corresponding measured quantum states, establishing the level of confidence in the validity of the plurality of transmitted random quantum states by verifying that the first and second statistical distributions are sufficiently similar, deriving a first binary sting and a second binary string, correlated to the first binary string, respectively from the transmitted and received plurality of quantum states not in the subset, and carrying out a reconciliation of the second binary string to the first binary string by using error correction techniques to establish the shared secret random cryptographic key from the first and second binary strings.

49 Claims, 8 Drawing Sheets

QUANTUM CRYPTOGRAPHY

FIELD OF THE INVENTION

The present invention concerns improvements relating to quantum cryptography and more particularly, though not exclusively, the present invention relates to a method of establishing a shared secret random cryptographic key between a sender and a recipient using a quantum communications channel. The present invention also relates to determining the security of a transmission of quantum bits over the quantum channel against eavesdroppers. For secure transmissions, the quantum bits can be used for creation of the shared cryptographic key that is used for encryption and decryption of messages from the sender to the recipient over conventional communication channels. The degree of security against eavesdroppers can be adjustable to provide a flexible communications system.

BACKGROUND TO THE INVENTION

One of the major problems in the field of cryptography is to restrict access to transmitted information such that only its intended recipient can correctly understand it. Modern day encryption techniques rely on a set of specific parameters, called a key, to be provided together with the actual message as an input to an encrypting algorithm. Similarly, for decryption, the key needs to be input together with the encrypted message to the decrypting algorithm to arrive at the original message. The encrypting and decrypting algorithms are often publicly known or announced and so the security of the encrypted message depends entirely on the secrecy of the key.

The key typically comprises a randomly chosen, sufficiently long string of bits. Once it has been determined, subsequent communication involves sending encrypted messages over any channel (even a public channel) whose continual security against eavesdroppers is not important. However, in order for the sender and recipient who share no secret information initially, to share a secret key it is necessary in classical key based communication protocols to transmit some key determining information along a secure and reliable channel. The security of any such classical key-based communication protocol is dependent on how difficult it is for an eavesdropper to derive the key from the transmitted key determining information. Furthermore, the sender and recipient have no way of ensuring that they can be certain of telling that any eavesdropping has taken place. Accordingly, no matter how difficult deriving the key may be, in principle this is an inherent weakness of all such classical key-based communication protocols.

Another inherent weakness is that in general, if the key length is shorter than the message length, it is not possible to give an absolute guarantee that useful information about the original text or key or both cannot be obtained by an eavesdropper who cryptanalyses the encrypted text.

One attempt to address the first of these problems uses the mathematical technique of public and private key protocols. In these protocols, messages are sent without the senders and recipients having agreed on a secret key prior to sending the message. Rather, this protocol works on the principle of encryption/decryption with two keys, one public key to encrypt it, and another private one to decrypt it. Everyone has a key to encrypt the message but only one person has a key that will decrypt it again so anyone can encrypt a message but only one person can decrypt it. The systems avoid the key distribution problem described above as public keys are widely distributed with no security. However, the security of these asymmetric security protocols unfortunately depends on unproven mathematical assumptions, such as the difficulty of factoring large integers (RSA—the most popular public/private key protocol—gets its security from the difficulty of factoring large numbers). There is a danger that mathematicians/computer scientists will probably come up with significantly faster procedures for factoring large integers and then the whole privacy and discretion of public/private key protocols could disappear instantly. Indeed, recent work in quantum computation shows that quantum computers will be able to factorize much faster than classical computers, so that, for example, RSA would be highly insecure if and when large quantum computers are built.

A new type of cryptography called Quantum Key Distribution (QKD) has emerged more recently. Existing quantum key distribution protocols fall into two basic classes: those requiring entanglement and those that do not. Entanglement-based protocols which use quantum computers to manipulate the qubits sent and received have some security and efficiency advantages in theory, and also can be used to implement quantum key distribution over long distances efficiently. However, no quantum computer has yet been built. Also, sources of entangled photons with flux rates comparable to those of sources of unentangled photons, currently do not exist. Hence, secure entanglement-based quantum key distribution (QKD) is presently difficult to implement in practice. It may well be that entanglement-based QKD will always be less efficient than non-entanglement-based QKD for a range of important applications.

There are several quantum key distribution protocols which do not require entanglement. The most commonly implemented is the Bennett-Brassard 1984 protocol, usually referred to as BB84 (Bennett C. H. and Brassard, G. Quantum Cryptography: Public Key Distribution and Coin Tossing. Proceedings of the IEEE International Conference on Computers, Systems and Signal Processing. IEEE, New York. pp. 175-179 [1984]). Others include the B92 protocol, the 6-state protocol considered by Bruss, and the Goldenberg-Vaidman protocol.

One of the key attributes which underpins all QKD protocols is that, according to quantum physics, observation generally modifies (disturbs) the state of what is being observed. By following protocols that exploit this property, two parties can set up a communication scheme that allows them to detect any eavesdropping by a third party, because they will be able to observe the disturbances introduced by any such third party.

The BB84 QKD protocol relies on a quantum communications channel between the sender and recipient being established such that quantum information such as light photons polarised into one of several states can be sent over the channel (e.g. a telecom optical fibre or beam transmitted through the atmosphere or through space). Also the protocol makes use of a public channel such as a radio channel over which public messages can be sent. The object of the protocol is to generate a random shared key kept secret from eavesdroppers, even when there is some level of eavesdropping on the communications that comprise the protocol. If so, the key can be rejected and the procedure repeated until a non-disturbed key has been received. No secret information is disclosed even if the eavesdropper happens to listen in because the actual secret information message is never sent until the key has been received without any eavesdropping. Once a key has been established between the sender and recipient, the secret information message can be coded at the sender with the shared secret key, transmitted over the public channel and securely decoded by use of the same shared secret key at the recipient.

The way in which the key is distributed from the sender to the recipient securely is described mathematically in various different texts, see for example Chapter 7: 'Quantum Cryptography' in 'Quantum Computation and Quantum Information' by Michael A. Nielsen and Isaac L. Chuang, 2000, publisher: Cambridge University Press; ISBN: 0521635039. However, the following example set out in the introduction to Quantum Cryptography at the Qubit.org website helps to understand the basic principle of how the protocol works.

"The system includes a transmitter and a receiver. A sender may use the transmitter to send photons in one of four polarisations: 0, 45, 90, or 135 degrees. A recipient at the other end uses the receiver to measure the polarisation. According to the laws of quantum mechanics, the receiver can distinguish between rectilinear polarisations (0 and 90), or it can quickly be reconfigured to discriminate between diagonal polarisations (45 and 135); it can never, however, distinguish both types. The key distribution requires several steps. The sender sends photons with one of the four polarisations which are chosen at random. For each incoming photon, the receiver chooses at random the type of measurement: either the rectilinear type or the diagonal type. The receiver records the results of the measurements bat keeps them secret. Subsequently the receiver publicly announces the type of measurement (but not the results) and the sender tells the receiver which measurements were of the correct type. The two parties (the sender and the receiver) keep all cases in which the receiver measurements were of the correct type. These cases are then translated into bits (1's and 0's) and thereby become the key. An eavesdropper is bound to introduce errors to this transmission because he/she does not know in advance the type of polarisation of each photon and quantum mechanics does not allow him/her to acquire sharp values of two non-commuting observables (here rectilinear and diagonal polarisations). The two legitimate users of the quantum channel test for eavesdropping by revealing a random subset of the key bits and checking (in public) the error rate. Although they cannot prevent eavesdropping, they will never be fooled by an eavesdropper because any, however subtle and sophisticated, effort to tap the channel will be detected. Whenever they are not happy with the security of the channel they can try to set up the key distribution again."

This example assumes communications will be perfect and noise-free in the absence of eavesdropping. However, in practice, it is known that no communications system is perfect and there are likely to be distortions provided in the transmitted qubits caused by the quantum channel or even by eavesdroppers. These errors are corrected by use of error correction and privacy amplification techniques which are known to the skilled addressee, see for example Chapter 7: 'Quantum Cryptography' in 'Quantum Computation and Quantum Information' by Michael A. Nielsen and Isaac L. Chuang, 2000, publisher: Cambridge University Press; "Generalised Privacy Amplification", C. Bennett et al, IEEE Trans. Info. Theory Vol 41 (1995) pp 1915-1923; and "Secret Key Agreement by Public Discussion from Common Information", U. Maurer, IEEE Trans. Info. Theory, Vol 39 (1993) pp 733-742.

The present invention aims to overcome or at least substantially reduce the problems described above and in the references mentioned above and to provide a robust method of distributing a secret key by transmitting quantum information.

The present invention has arisen from an appreciation that the prior art methods have required there to be a limited number (in the simplest cases, two or three) of possible bases or frames of reference for determining the state (of a pair of orthogonal states) to which a quantum element belongs. This limitation has been necessary with the prior art because of the underlying requirement to know which bases are correct, as has been discussed above and illustrated by the described prior art example. However, the present inventors have appreciated that it is not necessary to restrict the method of distributing a shared key to a small predetermined number of bases but rather an almost infinite number of different bases can be used. This is made possible by transmitting some information about a subset of the transmitted qubits, for example some information about the bases used for that subset of the transmitted qubits, which enables determination of the level of eavesdropping, if any. Then by using transmitted basis information about the rest of the transmitted qubits and by carrying out statistical analysis on that information, it is possible for the sender and recipient to derive correlated bit strings about which eavesdroppers can have little or no information. Then the discrepancies between the versions of the correlated bit strings at the sender and recipient caused by use of such large numbers of bases can then be reconciled using existing privacy amplification and error correction techniques to derive a shared secret key.

More specifically according to one aspect of the present invention there is provided a method of establishing a shared secret random cryptographic key between a sender and a recipient using a quantum communications channel, the method comprising: generating a plurality of random quantum states of a quantum entity, each random state being defined by a randomly selected one of a first plurality of bases ill Hilbert space; transmitting the plurality of random quantum states of the quantum entity via the quantum channel to the recipient; measuring the quantum state of each of the received quantum states of the quantum entity with respect to a randomly selected one of a second plurality of bases in Hilbert space; transmitting to the recipient composition information describing a subset of the plurality of random quantum states; analysing the received composition information and the measured quantum states corresponding to the subset to derive a first statistical distribution describing the subset of transmitted quantum states and a second statistical distribution describing the corresponding measured quantum states; establishing the level of confidence in the validity of the plurality of transmitted random quantum states by verifying that the first and second statistical distributions are sufficiently similar; deriving a first binary string and a second binary string, correlated to the first binary string, respectively from the transmitted and received plurality of quantum states not in the subset; and carrying out a reconciliation of the second binary string to the first binary string by using error correction techniques to establish the shared secret random cryptographic key from the first and second binary strings.

Reconciliation has primarily been used for overcoming errors in transmitted data between the sender and the intended recipient, however the present invention extends its use to act as a foundation for deriving two shared secret keys from two correlated data strings present at the recipient and the sender after quantum transmission of the data making up the strings. The appreciation that reconciliation/amplification techniques can be used in quantum cryptography in this way means that the number of bases used for encoding the state of the Qubits is not limited to a small finite number (two or three) as the prior art but becomes practically infinite.

The present invention describes an idea for refining earlier quantum key distribution schemes, based on the observation that it is not necessary for the sender and recipient to identify a string of qubits on which the recipient carried out measurements in a basis containing the qubit prepared by the sender. A problem with existing practical implementations of quantum key distribution is that, given the actually attainable bounds on the level of eavesdropping (which are nonzero, even if there is no actual eavesdropping, because of the presence of noise on the quantum channel) they generate a shared secret key at a relatively low bit rate. The present invention potentially offers a higher bit rate for secret key generation. Also, existing protocols have some potential security weaknesses arising from the fact that the sender's prepared qubits and the recipient's measurement choices are drawn from short lists of possibilities, which are known to (and if not, are deducible after some eavesdropping by) the eavesdropper. By allowing a much larger set of choices, the present invention reduces these potential weaknesses. Further, the existing protocols that are presently practical do not have the property of deniability. That is, the sender and recipient may, if interrogated after the fact, be able to generate a fake transcript of the protocol which produces a fake secret key of their choice, with less risk that their misrepresentation can be exposed even if their interrogator has eavesdropped on them during the key distribution protocol. The present invention describes protocols which are also presently practical but which potentially allow a greater degree of deniability.

The term 'quantum entity' is intended to mean any entity which is capable of having measurable quantum characteristics. For example, the embodiment of the present invention is described with reference to photons being the quantum entity with their measurable quantum characteristics being polarisation of the photon. However, other types of entities are also covered by the term, for example electrons and atomic nuclei where, in both cases, the spin degree of freedom can provide the measurable quantum characteristic.

Whilst existing prior art schemes such as BB84 QKD protocol are secure in principle, and can be made secure in practice, they potentially require rather more resources (i.e. more quantum and/or more classical communication per secure key bit generated) than the protocol of the present invention.

Preferably the first and second plurality of randomly selected bases in Hilbert space each comprise at least four random bases The higher the number of sets of bases the greater the potential level of security and hence potential benefit provided by the present invention.

The selecting step may comprise generating and measuring a first plurality of bases in two-dimensional Hilbert space. However, the selecting step may alternatively comprise generating and measuring a first plurality of bases in a real sub space of two-dimensional Hilbert space. This alternative implementation has some potential advantages in that it offers different and potentially advantageous tradeoffs between efficiency and security. It is also easier to implement in practice for some physical realisations.

More specifically, one advantageous way of implementing the establishing step would be to determine the degree of difference between the first and second statistical distributions; and to accept the security of the channel if the degree of correlation between the two distributions is greater than a threshold level. The use of statistical distributions provides a fast mathematical way of automatically assessing the degree of deviation of the measured results from the transmitted results. Furthermore, using statistical distributions allows a degree of error to be accommodated without the need for error correction techniques prior to the comparison step.

Preferably the method further comprises selecting the value of the threshold level. This advantageously enables the method to permit a level of eavesdropping which potentially may exceed that tolerable with prior art protocols As a result, the user can grade the level of information to be communicated and can determine a corresponding threshold level. Clearly, the lower the threshold, the more chance there is of a key being established on the first attempt. Also as transmission errors would also contribute to imperfect comparison results, the threshold can be set to accommodate such errors.

It is to be appreciated that, in the present embodiment, the step of generating a plurality of random quantum states comprises generating quantum states that are part of a two-dimensional system. However, the present invention can also extend to higher-dimensional systems where the generation step may comprise generating random quantum states describing more degrees of freedom. For example, say in three dimensions, different characteristics to be considered of say an atomic quantum entity could be the spin of a nucleus being greater than ½, the position wave function of one of its quantum objects (such as a photon, electron, nucleus, etc.) that is constrained so that its position lies in some fixed finite dimensional space, or the state of an excited atom which is constrained to lie in the space defined by some fixed finite set of energy levels.

For most practical applications of the present invention, it is preferable for the pluralities of bases to be approximately uniformly separated. If there are a large number of bases in the first plurality of bases in Hilbert space, then this can be achieved by choosing the bases randomly. However, in cases where there are fewer bases to choose from, the uniform separation can be ensured by choosing bases in a specific geometric configuration (for example one defined by a platonic solid) in which they are roughly uniformly separated. This applies to the complex version of Hilbert space version of the method. In the real subspace version for any number of N bases, they can be chosen to be precisely uniformly separated by taking the vectors in the Great Circle to be separated by angle pi/N.

The method may further comprise temporarily storing the received quantum states of the quantum entity prior to carrying out the measuring step. This enables the sender to transmit some specific information about the sender's bases which can then be used by the recipient in the measurement of the stored qubits. Also, in the absence of eavesdropping, storage advantageously allows the sender and recipient to generate a random shared key at the rate of one bit per photon qubit transmitted. Another major advantage of storage is that it offers a greater level of security to the communications protocol.

The second plurality of bases may be determined independently of the first plurality of bases. Whilst this clearly makes the method more complicated in that the reconciliation step has more work to do, it may however advantageously improve some aspects of the security of the method.

Preferably the established shared secret key is of the same size as the magnitude of the message which is to be encrypted. This is because as with all uses of a one-time pad encryption scheme (a.k.a. the Vernam cipher) it provides the maximum possible information-theoretic security. Of course it is also possible to accept imperfect security if the tradeoff is that this allows one to send a longer message. In addition, it is also possible to use a shared secret key K1 generated by the quantum scheme to encrypt another key K2 of the same length which is used in some standard classical cryptographic scheme, and then use this classical scheme to send messages of longer length. The security here is imperfect but could be very good: it relies on the facts that K2 is completely concealed from eavesdroppers, and that (if K2 is long) the classical scheme may be very hard indeed to break without knowledge of the key used (K2).

The present invention is practical and can be implemented with existing technology. In particular, there is no requirement for even small-scale quantum computers for implementation. Rather, the present invention can be implemented with single photon sources or weak photon pulses, and does not require an entangled photon source. This means that a relatively high qubit transmission rate is practical. A presently preferred embodiment of the present invention has the following potential advantages over existing similarly practical quantum key distribution schemes such as the B384, B92 and 6-state quantum key distribution protocols. First, it is potentially more efficient, in the sense that it allows more bits of the secret key to be generated per qubit sent, for a given level of eavesdropping. Second, it has a potentially higher security threshold, in the sense that it allows a secret key to be generated in the presence of a higher level of eavesdropping or noise than existing protocols. Third, it may be more secure, in the sense that it is resistant (or more resistant) to a wider variety of active eavesdropping attacks (in which physical states other than those used in the protocol are introduced into the quantum channel by the eavesdropper) and to other forms of sabotage. Fourth, it may allow the sender and recipient a higher level of deniability than those existing protocols which do not require quantum computation.

According to another aspect of the present invention there is provided a secure communications method for conveying a message from a sender to an intended recipient, the method comprising establishing a shared secret random cryptographic key between a sender and a recipient using a quantum communications channel using the method described above; using the shared secret key as a one-tine pad for secure encryption of the elements of the message at the sender; transmitting the encrypted message to the intended recipient using a conventional communications channel; and using the shared secret key as a one-time pad for secure decryption of the encrypted elements of the message at the recipient.

BRIEF DESCRIPTION OF THE DRAWINGS

Preferred embodiments of the present invention will now be described by way of example with reference to the accompanying drawings. In the drawings.

DETAILED DESCRIPTION OF THE PRESENTLY PREFERRED EMBODIMENTS

Figure 1:
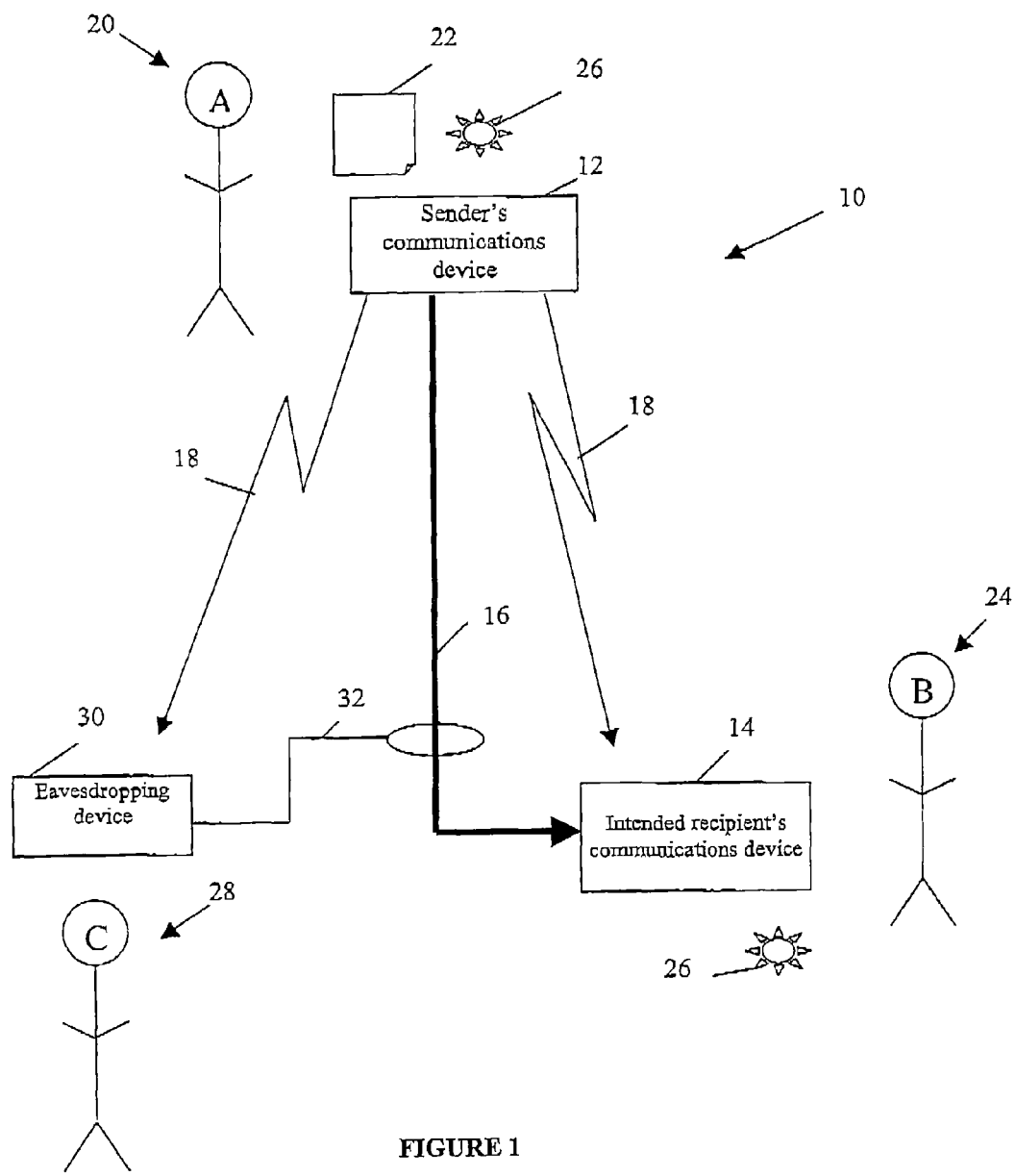
FIG. 1 is a schematic diagram showing quantum and radio communications system between two parties which is used for the secure communication of messages in accordance with a first embodiment of the present invention.

Referring to FIG. 1, there is shown a communications system 10 according to a first presently preferred embodiment of the invention. The system comprises a sender's communications device 12 and an intended recipient's communications device 14. These devices are, in this embodiment, arranged to support quantum communications that is respectively to send and receive photons that are each in a specified quantum state due to their particular polarisation. The devices 12, 14 are connected together via an optical fibre telecommunications link 16 which acts as a quantum communications channel. The sender's communication device 12 is also arranged to broadcast radio signals 18 over a public channel which can be received by the recipient's communications device 14.

The sender (A) 20 has, at his communications device 12, a secret document 22 that he wishes to send in an encrypted format to the recipient (B) 24. The actual encrypted document is sent as encrypted radio broadcast signals 18 to the recipient 14. In order to encrypt the document 22, the sender 20 has a secret shared encryption key 26 provided. Similarly, the recipient 24 also has a copy of the secret shared key 26 which he uses to decrypt the encrypted message sent over the public channel.

More specifically, the system 10 is used in two distinct phases. The first phase is to establish the secret shared key 26 between the sender 20 and the intended recipient 24. This is done by use of quantum signals sent via the quantum channel 16 and broadcast radio signal 18. The second phase involves using the shared key 26 to encode the document 22, transmission of the encoded document via broadcast radio signals 18 and, finally, correct decryption of the received encrypted message.

The system 10 is set up to prevent an eavesdropper (C) 28 using an eavesdropping device 30 with a covert connection 32 to the quantum channel 16 from listening in on the first phase transmission of quantum signals and deriving the shared quantum key 26. The way in which this is achieved is set out later in this description.

Figure 2:
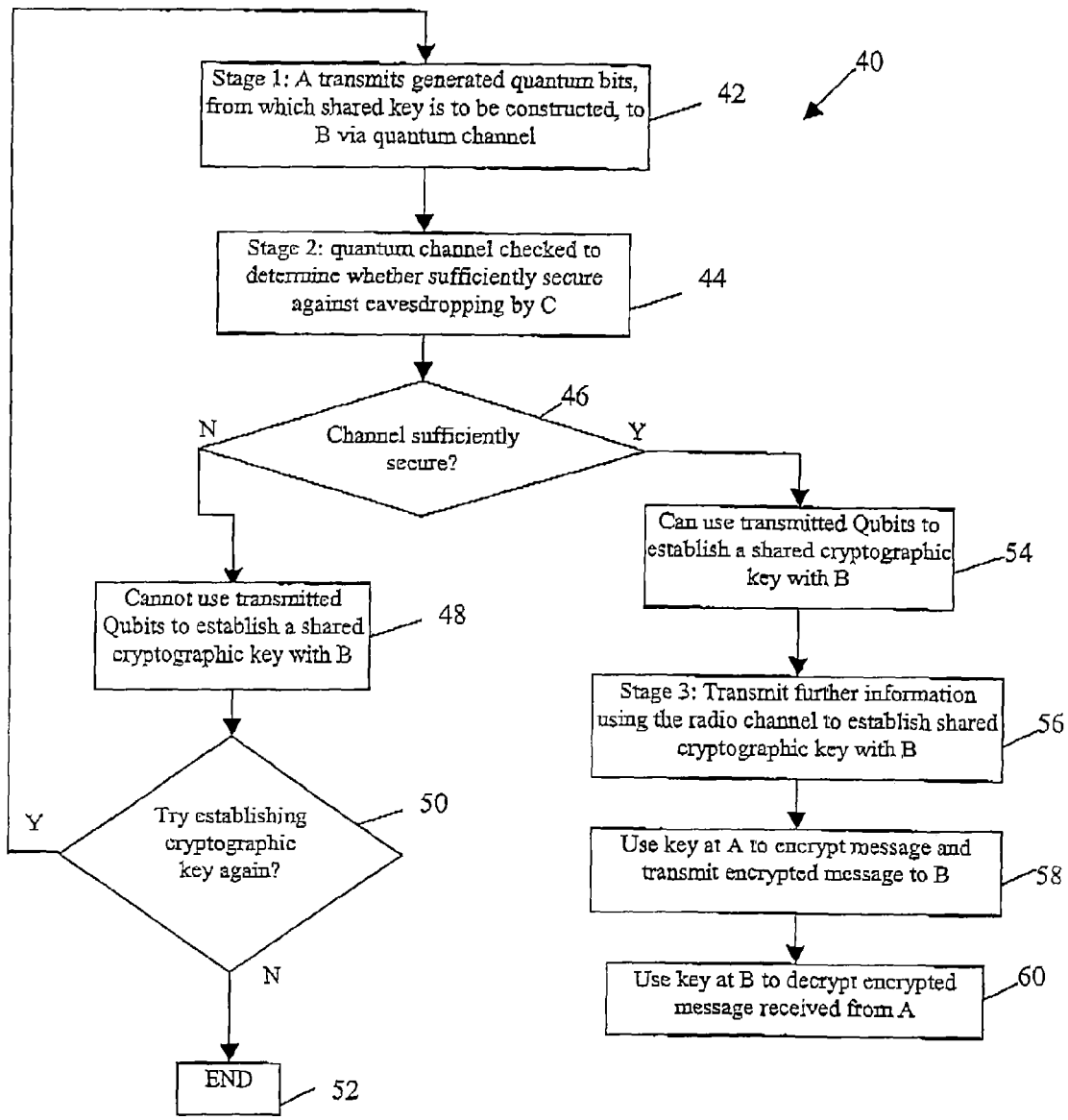
FIG. 2 is a flow diagram showing the different processing steps involved in implementing a secure transmission/reception protocol using the system of FIG. 1.

A method 40 of operating the system 10 to implement the first and second phases is now described in more detail with reference to FIG. 2. FIG. 2 shows how the first phase is made up of three distinct parts, Stages 1 to 3 which are each described below.

The method 40 commences with Stage 1 at Step 42 with the Sender (A) 20 generating and transmitting a stream of quantum bits (qubits) to the recipient (B) 24 via the quantum channel 16. These quantum bits are the pool of information which is used to generate the secret shared key 26. Whilst the qubits could relate to any physical property of an element which can be described by quantum states, as has been mentioned previously in this embodiment the qubits are polarised light photons. On receipt of the polarised photons, the recipient (B) 24 measures their quantum states.

Then Stage 2 of the first phase is carried out by the measured results being used at Step 44 to determine whether the quantum channel 16 is sufficiently secure against the eavesdropper (C) 28. This is possible because of the fact that the eavesdropper (C) listening in on the transmission of quantum states will in measuring them distort the quantum states. This in turn is detected by analysis at Step 44 that is carried out at the recipient (B) on the received qubits. Accordingly at Step 46, the method 40 determines whether the quantum channel 16 is secure. If the result of the analysis is that the channel is insecure, then the resultant conclusion is at Step 48 that the transmitted qubits cannot be used to establish the shared secret cryptographic key 26. If it is desired at Step 50 to try to establish the shared key 26 again, then the method 40 returns to Stage 1 to commence transmission of new qubits at Step 42. However, if it is not desired to try again, then the method ends prematurely at Step 52.

If the result of Step 46 is positive, then the conclusion is at Step 54 that the transmitted qubits can be used to establish the shared secret cryptographic key 26. In this case, Stage 3 is commenced at Step 56 with the transmission of further information using the public radio channel. This provides further information about the sender's information relating to the transmitted qubits such that the recipient (B) can derive sufficient statistical information to help establish the shared cryptographic key 26 at the recipient (described in detail later). Once the shared key has been established, it is used at Step 58 by the sender (A) 20 to encrypt the message 22 and the encrypted message is then sent as radio signals 18 to the recipient (B) 24. The recipient (B) then uses at Step 60 his recently generated secret shared key 26 to decrypt the sent encrypted message 22.

Figure 3:
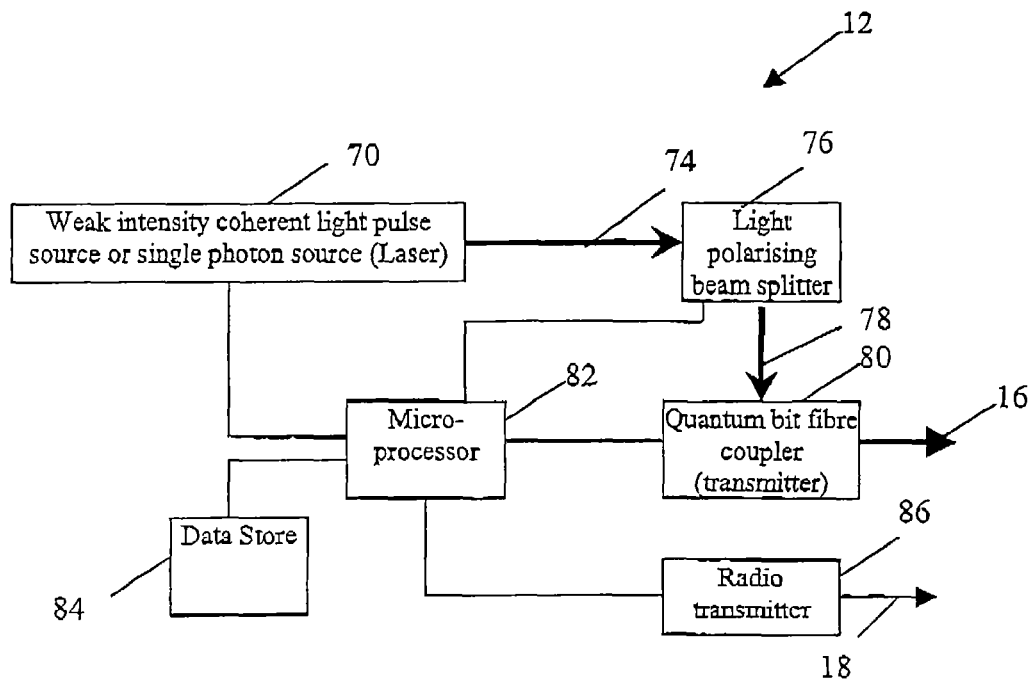
FIG. 3 is a schematic block diagram showing the data generation and transmission apparatus provided at the transmitting party.
Figure 4:
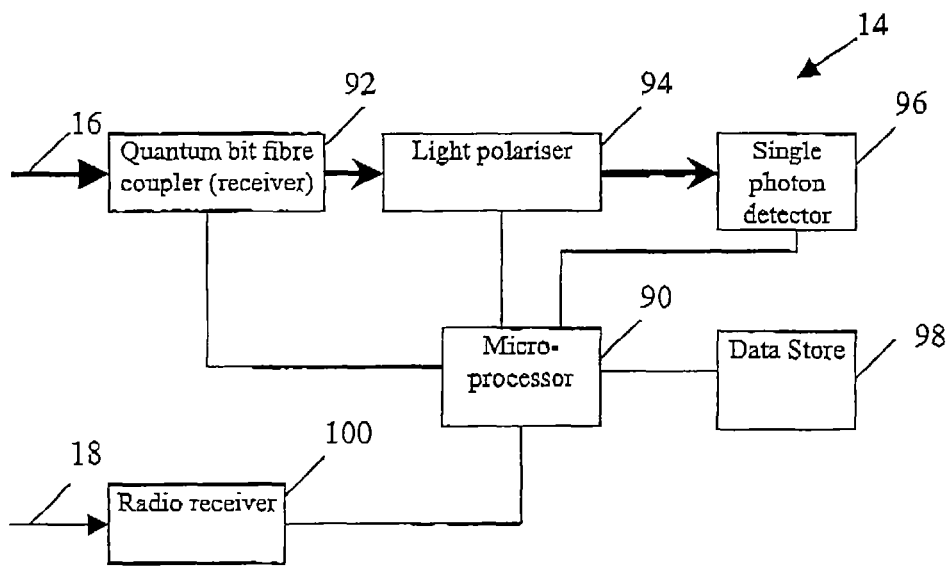
FIG. 4 is a schematic block diagram showing the data reception and reading apparatus provided at the receiving party.

Referring now to FIGS. 3 and 4, the sender's and recipient's quantum communications devices 12, 14 are described in greater detail. The sender's quantum communications device 12 comprises a laser source 70 configured to operate as a weak intensity coherent light pulse source and to generate pulses of photons or a single photon source. The weak intensity pulse will occasionally emit two or more photons at a time. However standard error correction/reconciliation techniques will ensure security by dealing with such multi-photon errors which occur very infrequently (the intensity of the weak laser to set to ensure that the probability of having two or more photons emitted is very small compared with the probability of a single photon being emitted).

The output of the source 70 is a relatively slow stream 74 of unpolarized photons which are fed into a light polarising beam splitter 76. The beam splitter 76 acts as a dial-in polariser, which polarises a received photon into a desired orientation. In this regard, it is to be appreciated that the beam splitter can polarise a photon into two opposite but equivalent orientations (e.g. 45° and 225°) such that whilst the planes of polarisation (base) of the photons are the same, thereby giving the same optical appearance, the vector orientation of the photon polarisation, in a quantum sense, is different and in fact opposite.

It is to be appreciated that it may not generally be easy to find a way of taking a non-polarised photon and making it into a photon of specified polarisation, on demand, with 100% efficiency. However, it is easy to take a photon in a general (e.g. non-polarised) state and produce either into a photon of the specified polarisation in a particular beam, or else a photon that either follows a different beam (and is not used for transmission along the quantum communications channel 16) or else is absorbed by a filter. It is important in this case to ensure that this does not produce a beam of to photon pulses in which the time separations of the pulses indirectly give some information about their polarisations—which could happen if some polarised states are easier to make than others, so that it takes longer to produce the latter than the former. Accordingly the light polarising beam splitter 76 is arranged to produce a beam of equally separated pulses of photons in randomly independently chosen polarisations. Alternatively, the beam splitter 76 can be arranged to produce a beam in which the separations are not necessarily equal but are uncorrelated with the polarisation states.

The beam splitter 76 has a resolution of 0.001 radians such that the polarisation orientation of each photon can be accurately controlled and such that there are thousands of different orientations to choose from. A resultant slow stream of polarised photons 78 is then fed into a quantum bit fibre coupler 80 which transmits the stream of polarised photons 78 into the quantum communications channel 16.

The microprocessor controller 82 (as mentioned above) is provided and controls the operation of the laser source 70, the light polarising beam splitter 76 and the quantum bit fibre coupler 80. In particular, the microprocessor controller 82 determines the random polarisation of each photon by operational control of the beam splitter 76. The microprocessor controller 82 uses a data store 84 to store data describing the quantum states of each of the polarised photons. This stored information is used later to establish the shared secret key 26 between the sender (A) 20 and recipient (B) 24.

The device 12 also comprises a radio transmitter 86 connected to the microprocessor to controller 84. The radio transmitter 86 transmits information from the microprocessor controller 84 regarding the bases of at least some of the transmitted qubits as is explained later. Even though the radio transmitter 86 is shown to be part of the device 12, it is to be appreciated that it can readily be realised as a separate unit to which the microprocessor controller 84 simply relays a communication that is to be broadcast as radio signals 18.

Referring now to FIG. 4, the intended recipient's quantum communications device 14 is operated by a microprocessor controller 90. The microprocessor controller 90 not only controls measurement of the received qubits but also carries out statistical computation as is described later. The quantum communication channel 16 is coupled to a quantum bit fibre coupler 92, which receives the stream of polarised photons 78 from the sender's transmitting device 12 and conveys them to a light polariser 94 and a single photon detector 96. Both the light polariser 94 and single photon detector 96 are under the control of the microprocessor controller 90. Here for each received photon, the microprocessor controller 90 randomly selects a measurement orientation (basis), configures the light polariser 94 into the selected orientation and carried out measurement of the quantum state of the received photon in the given basis defined by the orientation. It is highly likely in the present embodiment that the measurement basis is not the same as the sender's basis. Accordingly, this naturally loses at least some of the information carried by the qubits transmitted However, this loss of information is not disastrous as it can be allowed for as is described later.

The device 14 also comprises a data store 98 for storing information describing the measured received qubits and programs for executing both control algorithms (not shown) and statistical analysis programs (not shown). Finally, a radio receiver 100 coupled to the microprocessor controller 90 is provided for receiving the transmitted radio signals 18 from the sender's device 12. Again, it is to be appreciated that the radio receiver 100 may not be part of the device 12, but rather may be readily realised as a separate unit from which the microprocessor controller 90 simply receives the communication that has been broadcast as radio signals 18 from the sender's device 12.

It is useful to understand how the constraints placed on certain quantum states in Hilbert space enable specific polarisations of photons to be generated for this embodiment. Whilst this information is generally known (see 'Quantum Computation and Quantum Information' by Michael A.

Nielsen and Isaac L. Chuang, 2000, is publisher: Cambridge University Press) some important points are briefly explained below.

Figure 5:
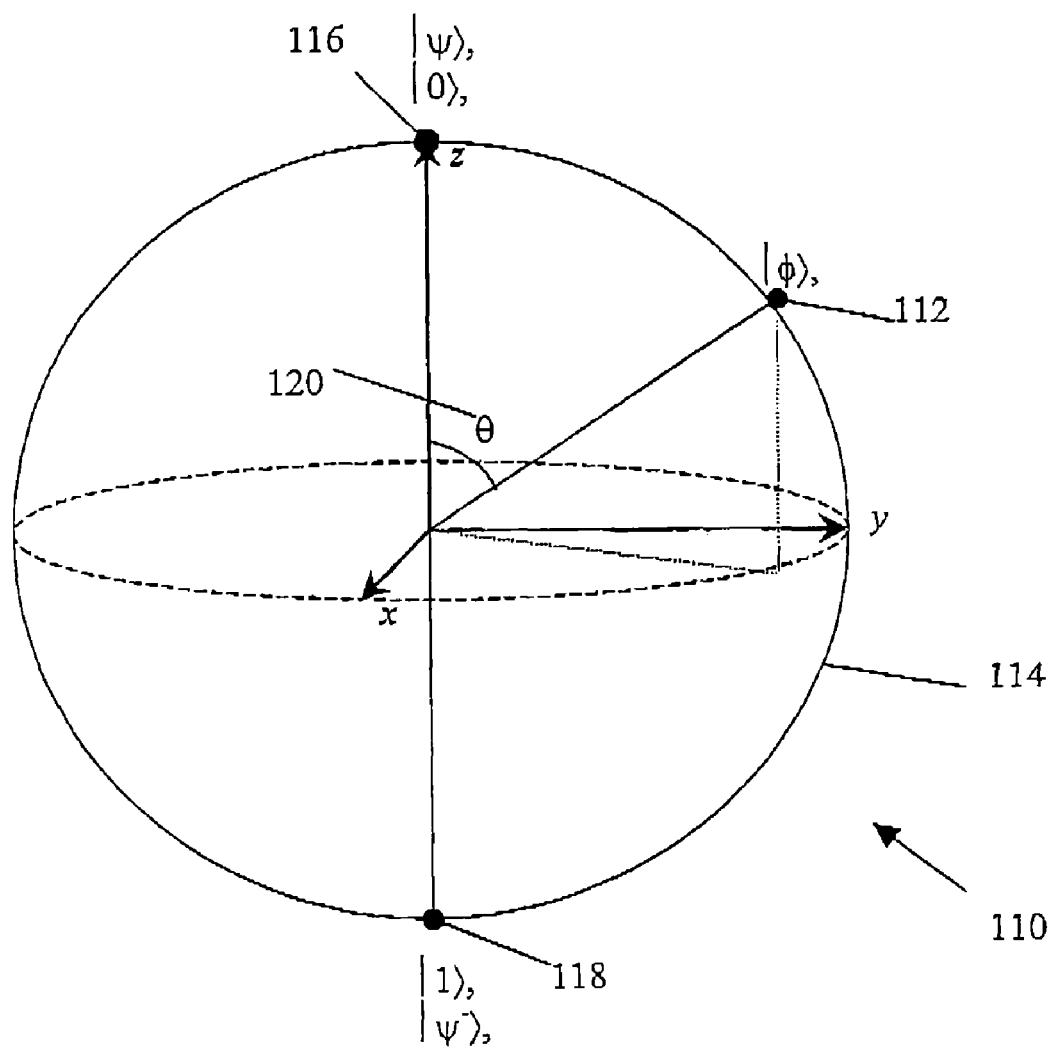
FIG. 5 is a diagram illustrating a representation of Hilbert space and the quantum state of a photon generated by the data Generation and transmission apparatus of FIG. 3 within that Hilbert Space.

Referring to FIG. 5, the general pure quantum state of a physical parameter of an entity can be represented in two-dimensional Hilbert space 110 by a quantum state vector |ϕ>, 112 on the Bloch sphere 114 of radius 1. The quantum bit states of zero and one can also be represented by antipodal basis vectors |0>, 116 and |1>, 118 respectively. This representation is valid since pure quantum states correspond to vectors of Mod 1 length. The basis vectors |0>, 116 and |1>, 118 are considered to be a basis which can be in any part of the Bloch sphere 114 and as such take the general labels |Ψ>, and |Ψ'>, respectively. The general state of any vector can be said to be:

$$|\phi>=\alpha|0>+\beta|1>,$$

where α and β are both complex numbers, $|\alpha^2|+|\beta^2|=1$, and θ, 120 is the angle between |ϕ>, and |Ψ>.

Accordingly, |ϕ>, 112 can be represented by a linear combination of zero and one state qubits 116, 118. It is to be appreciated that polarisation is possible into one of thousands of possible states. This means that for the selected bases |Ψ>, |Ψ''>, say at the qubit measurement step, there will be a probability (p) that the photon is in a given state as set out below:

$$p(|\phi>,|\Psi>)=\tfrac{1}{2}(1+\cos^2\theta)$$

$$p(|\phi>,|\Psi''>)=\tfrac{1}{2}(1-\cos^2\theta)$$

Knowledge of these probability functions enables the statistical determination of whether there has been distortion of the transmitted quantum information by the eavesdropper 28.

Figure 6:
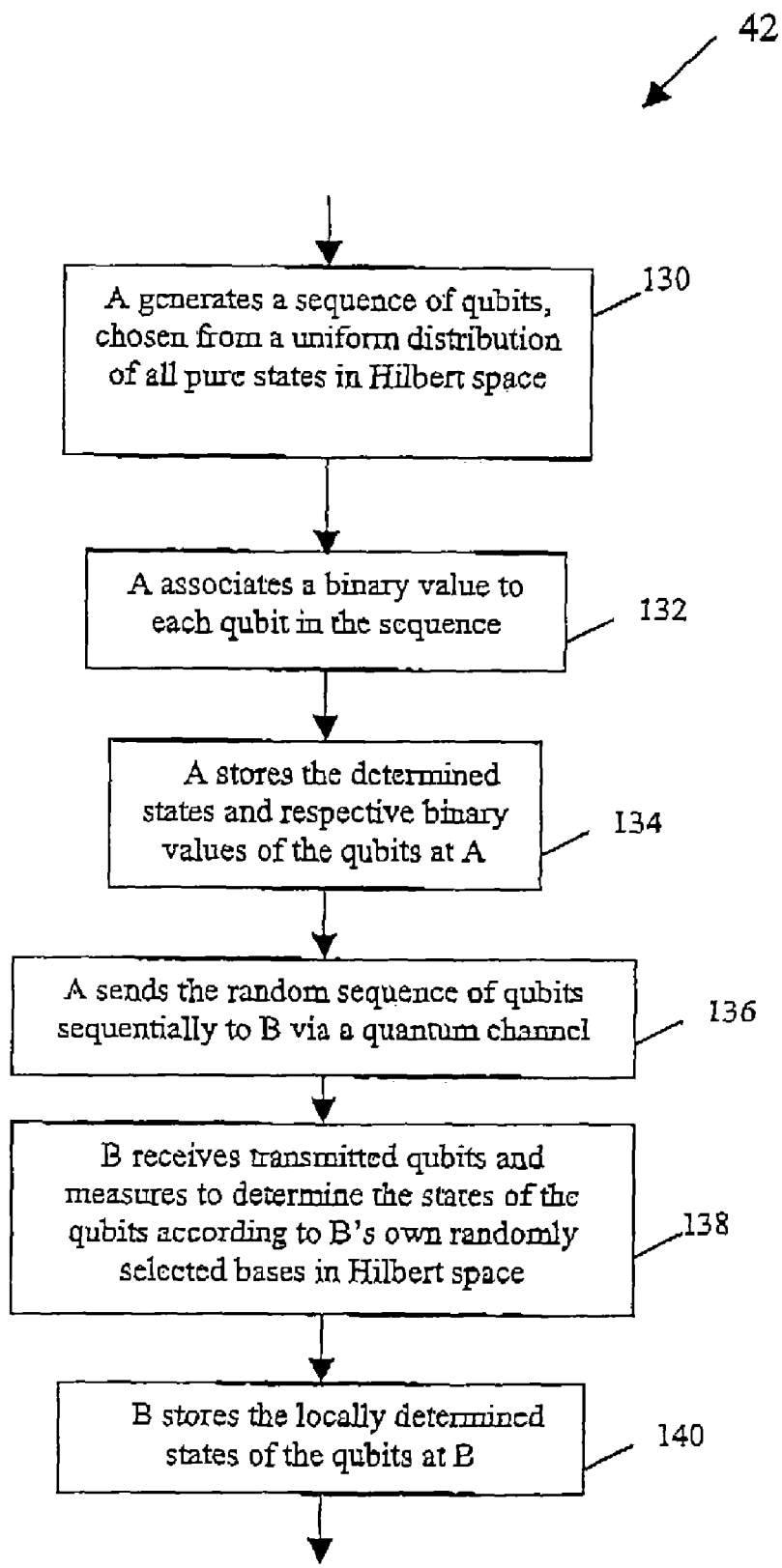
FIG. 6 is a flow diagram showing a first processing stage of the diagram in FIG. 2 in detail.

Referring now to FIG. 6, Stage 1 at Step 42 of the first phase which establishes the secret shared key 26 between the sender 20 and the intended recipient 24 is described in greater detail. Stage 1 commences at Step 130 with the generation of a sequence of qubits, which are randomly and independently chosen from a uniform distribution of all pure states of photons in two-dimensional Hilbert space. (A pure state lies at the surface of the Bloch sphere of FIG. 5). In this regard, the polarisation by the beam splitter 76 of the photons is random and independent but is constrained to ensure that the possible states are pure.

Stage 1 at Step 42 continues with the sender 20 assigning at Step 132 a binary value to each qubit in the sequence. In practical terms, this equates to assigning a bit value to each opposed direction in the plane of polarisation such that a photon polarised in that plane can have either a value of one or zero. The sender 20 then stores at Step 134 the assigned states for the sequence of qubits in the data store 84. As is set out later, these stored states are used in the subsequent establishment of the shared secret key 26.

The sender 20 then sends at Step 136 the random sequence of qubits to the recipient 24 via the quantum channel 16. It is not known at this stage whether the quantum channel is secure against the eavesdropper (C) 28. However, the recipient 24 receives at Step 138 the transmitted qubits and measures them to determine the states of the qubits according to the recipient's own randomly and independently selected bases in Hilbert space. It is to be appreciated that the recipient 24 assumes the same constraints as were used in the creation of the qubits at the sender 20. Stage 1 at Step 42 completes with the recipient 24 storing at Step 140 the locally determined states of the qubits in the data store 98 for future analysis.

Figure 7:
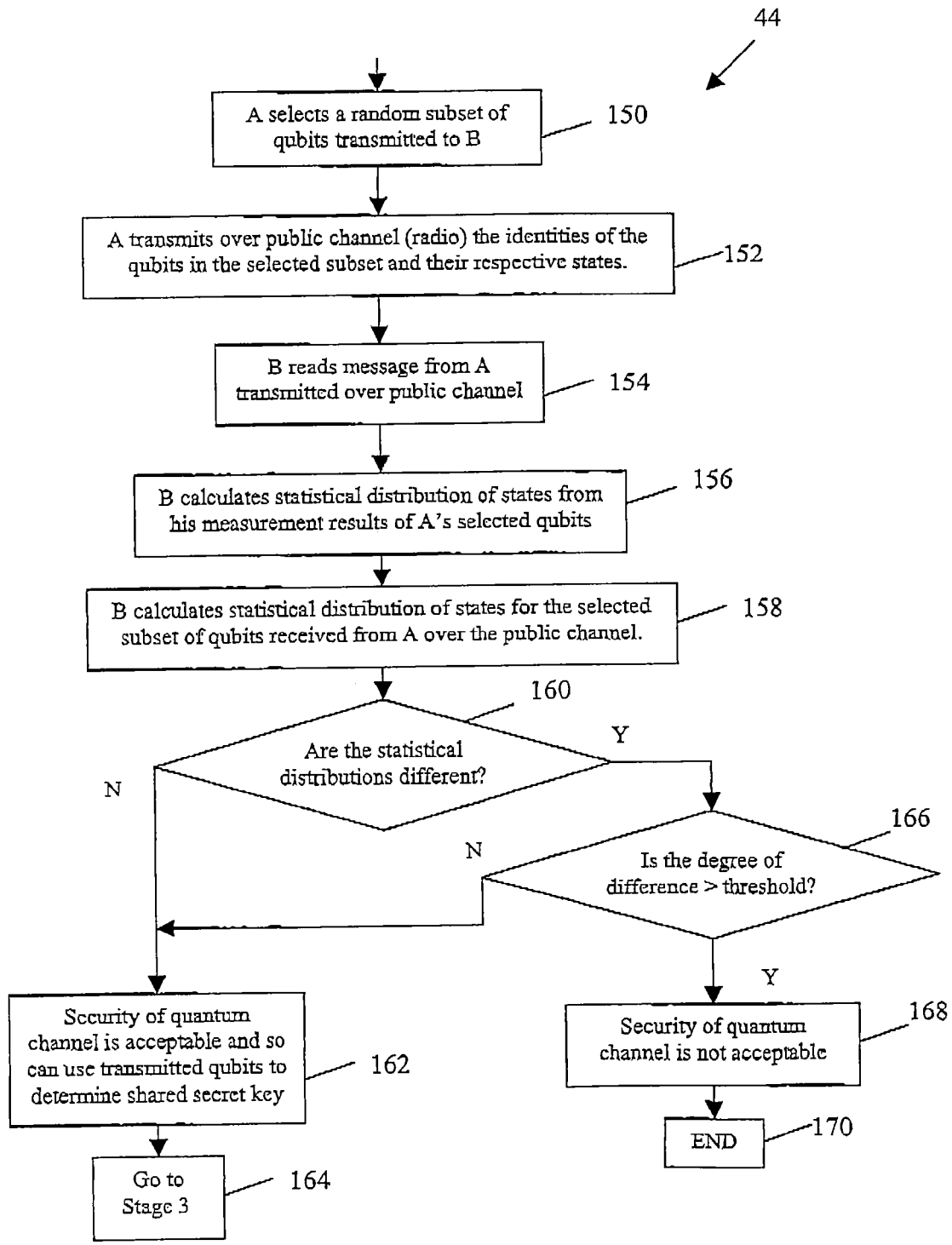
FIG. 7 is a flow diagram showing a second processing stage of the diagram in FIG. 2 in detail.

FIG. 7 shows the details of Stage 2 at Step 44 of the first phase which establishes the secret shared key 26 between the sender 20 and the intended recipient 24. The purpose of Stage 2 is to place a reliable statistical bound on the level of eavesdropping, if any. Stage 2 at Step 44 commences with the sender choosing at Step 150 a random subset of the set of qubits that has been transmitted to the recipient. For example, if the set of transmitted qubits comprises a million quantum bits, then the random subset selected at Step 150 might perhaps comprise 10,000 quantum bits. The sender (A) 20 then transmits at Step 152 over the public (radio) channel, the identities of the qubits in the selected subset and their respective states The recipient (B) 24 then reads at Step 154 the qubit subset identities and their respective correct quantum states. Using this information, the recipient can identify the corresponding qubits which were transmitted by the sender over the quantum channel 16 in Step 136, and look at the stored measurement results for these respective qubits. Having identified these measurement results, the recipient then determines at Step 156 a first statistical distribution of the results. Similarly, the recipient also calculates at Step 158 a second statistical distribution of the identities of the qubits in the selected subset and their respective states, which were transmitted in Step 152 by via the public (radio) channel.

These first and second statistical distributions are then compared at Step 160. If the quantum channel 16 and both the sender's and recipient's quantum communication devices 12, 14 are perfect (no transmission errors or any other errors, i.e. noise free) and there is no eavesdropping, the recipient's measurement results should have a statistical distribution that is predicted by quantum theory for the relevant measurements. Accordingly, if the two statistical distributions are not different the security of the quantum channel 16 is considered at Step 162 to be acceptable and so the transmitted qubits can be used to determine the secret shared key 26. However, in practice, it is highly likely that the actual results will not agree perfectly with these predictions, because there will inevitably be some errors (even if there is no eavesdropping). Therefore, if the statistical distributions are different, as determined at Step 160, then the degree of difference is considered at Step 162. The degree of difference is compared with a preset threshold, which is selected to put a statistical bound on the level of eavesdropping/transmission errors that can be taking place. If the difference is not greater than the threshold, then Stage 2 at Step 44 of the first phase can proceed to Step 162 where the security if the quantum channel is considered to be acceptable. Otherwise, the security of the quantum channel is considered to be unacceptable at Step 168 and the first phase of establishing the secret shared key 26 between the sender 20 and the intended recipient 24 is brought to an end for the transmitted qubits.

The way in which the statistical distribution of measurement results is predicted from quantum theory for the sender (A) 20 and the recipient (B) 24 is now described:

Suppose that for some particular pulse, A sends a pure qubit state |a> and B carries out a measurement in the bases |b>, |b'>, where <b|b'>=0.

The convention used here is that all of the states are normalised, i.e. <a|a>=<b|b>=|b'|b'>=1.

Now the probability of B obtaining the outcome |b>, assuming no noise etc, is |<a|b>|^2 and the probability of outcome |b'> is |<a|b'>|^2.

By looking at the measurement results for the whole subset of pulses which are being used in this stage, B creates a list of states for which the less likely outcomes had probability between p and (p+dp), for any particular choices of p (in the range 0<=p<=0.5) and dp (less than 0.5−p). In particular, B takes dp to be small (say, 0.01, for illustration) and a divisor of 0.5, so that 0.5=n dp (so n=50 in the illustration), and divides the list up into sublists of states in which the less likely outcome had probability in the ranges:

[1,dp], [dp, 2dp], [2dp, 3dp], ..., [(n−1) dp, 0,5].

B then, for each sublist [r dp, (r+1) dp], looks at the actual results and see how frequently the less likely outcome occurred. It should have been observed in a fraction roughly equal to ((r+0.5) dp) of the total and since the distribution is approximately binomial, B can test whether or not the results agree with theory for each sublist (this is not explained in detail herein as implementing this test is well within the ability of the skilled addressee). More generally, B can test statistically whether or not the results agree with theory for the whole collection of sublists, and if not, statistically estimate the discrepancy which gives an estimate of the maximum level of eavesdropping consistent with the data (again the skilled addressee will be well aware of how to implement this statistical measure). This discrepancy is compared against the predetermined threshold in Step 166.

Figure 8:
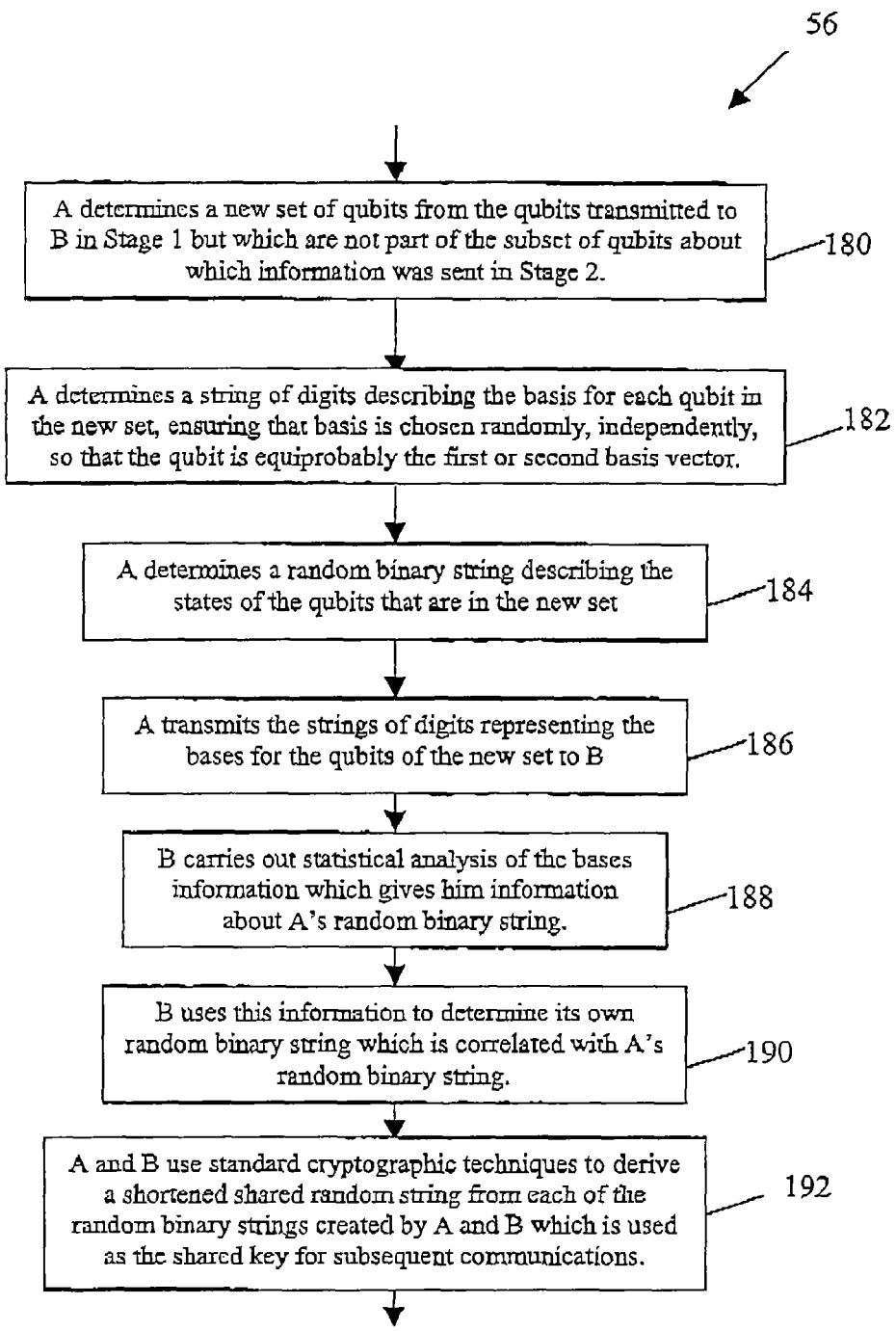
FIG. 8 is a flow diagram showing a third processing stage of the diagram in FIG. 2 in detail.

Referring now to FIG. 8, the details of Stage 3 at Step 56 of the first phase is now described. When this stage is reached, the sender (A) 20 will have generated and transmitted all of its set of qubits to the recipient (B) 24, the recipient will have measured the states of the received qubits and the quantum channel will have been assessed to have an acceptable level of eavesdropping. The sender (A) 20 firstly determines at Step 180 a new set of qubits as all of the qubits transmitted to the recipient about which no confirmatory information has been sent to the recipient (B) 24 in Stage 2 at Step 44. It is from this new set of qubits that the actual shared random key 26 is generated.

The sender (A) 20 determines at Step 182 a string of binary digits describing the bases for each qubit in the new set. Here each string of binary digits has by virtue of the procedure described below a sufficient degree of randomness to ensure that the state of the corresponding qubit is not derivable solely from that string of binary digits. In addition, the sender derives at Step 184 his own key string (not shown) of random binary values describing the states of the qubits that are in the new set. This key string is the root from which the sender's version of the shared secret key 26 is generated.

In order for the recipient 24 to have the means to derive its version of the shared secret key 26, the sender 20 transmits at Step 186 the stings of binary digits (bases description) representing the bases of each qubit in the new set to the recipient 24. A basis description is selected in which the qubit sent randomly appears as either the first or the second basis elements of the basis description. The choices as to where the correct qubit appears are equiprobable and made independently for each qubit. For each qubit in the list, the first basis element corresponds to zero and the second to a one.

It is to be appreciated that no explicit information about the state of the qubit to which the basis description belongs is sent in Step 186. The point is that the qubit is either the first basis element (corresponding to the sender's label of 0) or the second, and these are equiprobable. From the point of view of the eavesdropper 28, all he learns from this information is that the qubit is an equal mixture of the two basis states. But every equal mixture of two orthogonal basis states corresponds to the same (mixed) quantum state. However, although the state is random and not derivable by the recipient or third parties from the basis description alone, the recipient (or third parties) can obtain some information about the qubit state from a combination of the basis description and a measurement on the qubit state. For instance, if the sender 20 says the basis was |a>,|a'> (as usual these are orthogonal and normalised), and the recipient 24 carried out a measurement in basis |b>,|b'> and got answer |b>, the recipient 24 knows that with probability |<a|b>|^2 the transmitted state was |a>, and with probability |a'|b>|^2 it was |a'>. This follows from the facts that |a> and |a'> were equiprobable and that the respective probabilities of obtaining |b> from the states |a>,|a'> are |<a|b>|^2, |<a'|b>|^2.

This transmission is made as radio signals 18 over the public channel. The recipient 24 on receipt of this transmitted information, then carries out at Step 188 statistical analysis of the bases information (strings of binary digits) and derives some statistical information about the sender's key string. This information is then used at Step 190 by the recipient to determine its own binary key string which is correlated to the sender's. Finally, standard cryptographic techniques (such as error correction and privacy amplification methods) are employed at Step 192 to derive from the recipient's binary key string a shortened shared random binary string which is used as the actual shared secret key 26 for subsequent communications between the sender and recipient.

Figure 9:
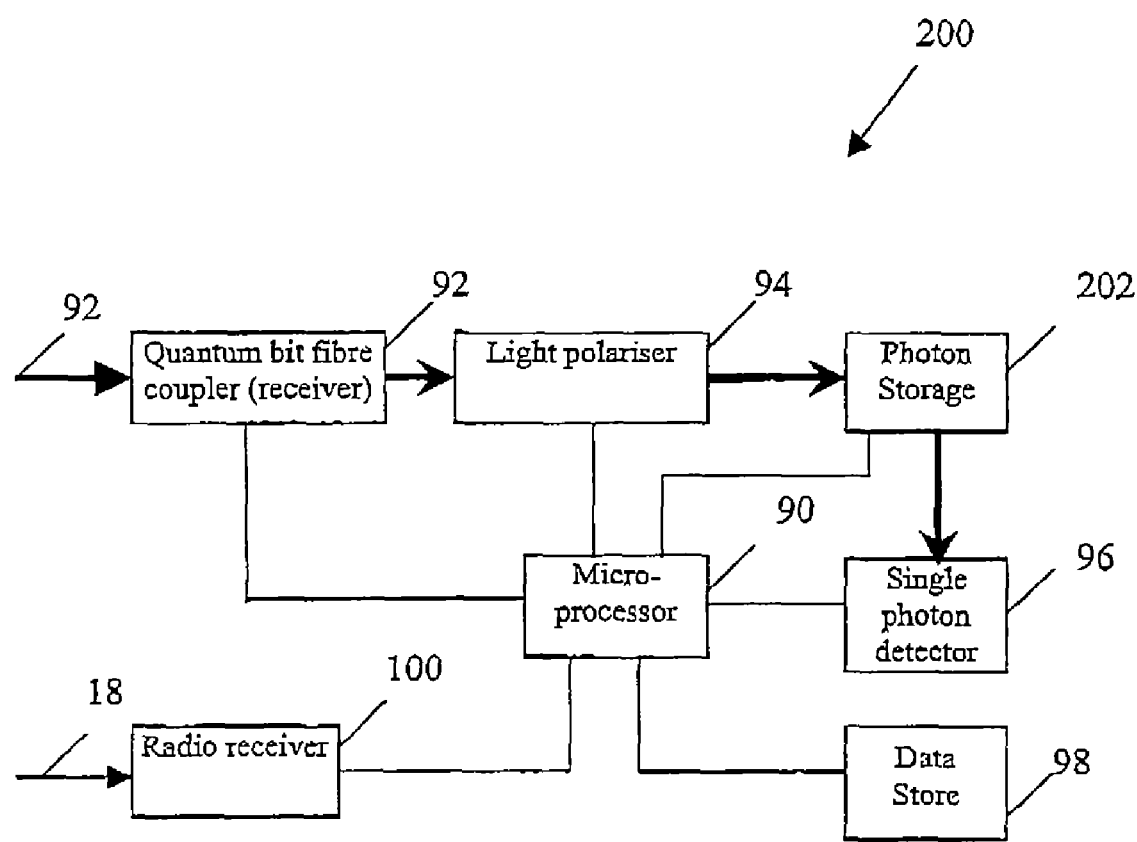
FIG. 9 is a schematic block diagram showing the data reception and reading apparatus provided at a receiving party according to a second embodiment of the present invention.

Referring now to FIG. 9, a second embodiment of the present invention is now described. The second embodiment is similar in many ways to the first embodiment and so, for the sake of brevity, the following description is limited to the differences between the embodiments. The major difference between the first and second embodiments is that the recipient's quantum communication device 200 in the second embodiment has the ability to store quantum states for some time before carrying out measurements. Whilst photon storage is currently not a very well developed field of technology it is a rapidly advancing area and published papers have described systems which show how the storage can be effected in practice; for example, by the use of multiple reflections in plane mirrors. FIG. 9 shows the recipient's communication device 200 comprising a photon storage unit 202 in addition to the other elements seen in FIG. 4 of the first embodiment which have been numbered with corresponding reference numerals.

The storage is used by the intended recipient 24 in the following way. On receipt of a photons the recipient's communications device 200 does not measure its quantum state, but rather puts it into the photon storage unit 202 with a view to preserving its quantum state for as long as possible. The recipient 24 then waits for the sender 20 to send him information about the basis to which the photon states belong. These are randomly encoded as in the first embodiment such that the actual states sent are equiprobably the first and second basis elements, this choice being made randomly each time with the classical bits one and zero being encoded by the first and second basis elements respectively. Only after receiving this information does the recipient 24 carry out the measurements on the photons. The quantum state of each received photon is measured in the basis that the sender 20 has indicated to the recipient 24 the state belongs.

In the absence of eavesdropping or channel noise, this advantageously allows the sender and recipient to generate a random shared key 26 at the rate of one bit per photon qubit transmitted. In practice, the possibility of eavesdropping or noise is accommodated by proceeding through the standard procedure described in the first embodiment, namely, using some subset of the states to obtain a statistical bound on the maximum level of eavesdropping consistent with the data and then using the remaining states to generate the shared secret key by privacy amplification. The advantage of the use of storage at the recipient in the randomly distributed communication protocols described herein is that it offers a greater level of security, for a given rate of key bit generation, and likewise a greater rate of key bit generation for a given level of security.

For each of the above described embodiments, it is possible for the sender 20 and recipient 24 to agree not to use the full Hilbert space of two-dimensional states but to use some real fixed subspace, corresponding to states on a great circle on the Bloch sphere (see FIG. 5) namely a real subspace of two-dimensional states of full Hilbert spaces. For example, as polarised photons are being used the sender 20 and recipient 24 choose to use only real superpositions of the horizontally and vertically polarised photon states. In this new embodiment, the sender's randomly chosen qubit states are drawn from the uniform distribution on the real subspace, as are the recipient's chosen measurements. As before, the random choices are made independently for each and every polarisation.

In a further variation that applies to both of the above described complex (two-dimensional states) and real (a real subspace of two-dimensional states) versions of the invention, the information which the sender and recipient exchange across the public radio channel and the way in which the qubits are used to code for a binary string, may be altered. For example, if it is advantageous in Stage 3 at Step 56, the recipient 24 may send to the sender 20 over the public radio channel a description of the measurements the recipient 24 has carried out on each received qubit, so that the sender and recipient both know how their respective random strings are correlated before privacy amplification. In this regard, the recipient's communications device 14 would further comprise a radio transmitter (not shown) for communicating information back to the sender and the sender's communications device 12 would further comprise a radio receiver (not shown) for receiving the communications from the recipient's communications device 14. This radio communications link back to the sender could also be used to support the sender's and recipient's discussion of the statistical tests used that allow them to estimate the maximum level of eavesdropping.

Furthermore, the sender may generate his own random string from the qubits sent by some more complicated coding scheme (for instance by using several qubits to code for a single bit of the random string) and might send the recipient only partial information over the radio channel.

As has been mentioned above, for most practical applications of the present embodiment, it is preferable for the pluralities of bases to be at least approximately uniformly separated. If there are a large number of bases in the first plurality of bases in Hilbert space, then this can be achieved by choosing the bases randomly. However, in cases where there are fewer bases to choose from, the uniform separation can be ensured by choosing bases in a specific geometric configuration (for example, one defined by a Platonic solid) in which they are roughly uniformly separated. One natural way of achieving this is by arranging for each of the bases to have one vector going through the corner of a Platonic solid inscribed in and concentric with the Bloch sphere. This applies to the complex version of Hilbert space version of the method. In the real subspace version for any number of N bases, they can be chosen to be precisely uniformly separated by taking the vectors in the Great Circle to be separated by angle pi/N.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims.

The invention claimed is:

1. A method of establishing a shared secret random cryptographic key between a sender and a recipient using a quantum communications channel, the method comprising:
    generating a plurality of random quantum states of a quantum entity, each random state being defied by a randomly selected one of a first plurality of bases in Hilbert space, the first plurality of bases being randomly and independently chosen from a uniform distribution of all pure quantum states in Hilbert space;
    transmitting the plurality of random quantum states of the quantum entity via the quantum channel to the recipient;
    measuring the quantum state of each of the received quantum states of the quantum entity with respect to a randomly selected one of a second plurality of bases in Hilbert space, the second plurality of bases being randomly and independently chosen from a uniform distribution of all pure quantum states in Hilbert space;
    transmitting to the recipient composition information describing a subset of the plurality of random quantum states;
    analysing the received composition information and the measured quantum states corresponding to the subset to derive a first statistical distribution describing the subset of transmitted quantum states and a second statistical distribution describing the corresponding measured quantum states;
    establishing the level of confidence in the validity of the plurality of transmitted random quantum states by verifying that the first and second statistical distributions are sufficiently similar;
    deriving, a first binary string and a second binary string, correlated to the first binary string, respectively from the transmitted and received plurality of quantum states not in the subset; and
    carrying out a reconciliation of the second binary string to the first binary string by using error correction techniques to establish the shared secret random cryptographic key from the first and second binary strings.

2. A method according to claim 1, wherein the first and second plurality of bases in Hilbert space each comprise at least four random bases.

3. A method according to claim 1, wherein the selecting step comprises generating and measuring a first plurality of bases in two-dimensional Hilbert space.

4. A method according to claim 1, wherein the selecting step comprises generating and measuring a first plurality of bases in a real subspace of two-dimensional Hilbert space.

5. A method according to claim 1, wherein the composition information transmitting step comprises transmitting information describing the bases of the subset of the plurality of random quantum states.

6. A method according to claim 1, wherein the analysing step comprises analysing the information describing the bases to derive the first statistical distribution.

7. A method according to claim 1, wherein the establishing step comprises determining a statistical error rate.

8. A method according to claim 1, wherein the establishing step comprises:
    determining the degree of difference between the first and second statistical distributions; and
    accepting the security of the channel if the degree of correlation between the two distributions is greater than a threshold level.

9. A method according to claim 8, further comprising selecting the value of the threshold level.

10. A method according to claim 1, wherein the subset information transmitting step comprises transmitting the subset information over a public channel, such as a radio channel.

11. A method according to claim 1, wherein the deriving step comprises transmitting information to the recipient representing the bases for the quantum states not in the subset which make up the first binary string.

12. A method according to claim 1, wherein the carrying out the reconciliation step comprises using privacy amplification techniques.

13. A method according to claim 1, wherein the quantum entity is photons and the quantum states are degrees of polarisation of the photons.

14. A method according to claim 1, further comprising temporarily storing the received quantum states of the quantum entity prior to carrying out the measuring step.

15. A method according to claim 14, wherein the measuring step is carried out after the temporary storing step and uses the received recipient composition information to determine some of the bases of the second plurality of bases.

16. A method according to claim 1, further comprising determining the second plurality of bases independently of the first plurality of bases.

17. A method according to claim 1, wherein the first and second pluralities of bases are selected randomly.

18. A method according to claim 1, further comprising the recipient transmitting some information about the bases chosen for measurement and/or the measurement results to the sender.

19. A method according to claim 1, wherein the step of carrying out the reconciliation comprises using several quantum states to generate a single bit of the shared secret key at both the sender and recipient.

20. A method according to claim 1, further comprising transmitting data regarding the second statistical distribution from the recipient to the sender.

21. A method according to claim 1, further comprising determining the size of the secret shared key to be of the same order as the size of a message to be encrypted with the key.

22. A method according to claim 1, wherein each of the plurality of random quantum states define two-dimensional information describing the condition of the quantum entity.

23. A method according to claim 1, wherein each of the plurality of random quantum states define n-dimensional information describing the condition of the quantum entity, where n is three or more.

24. A method according to claim 1, wherein the plurality of random quantum states are arranged geometrically to be uniformly separated within Hilbert space.

25. A secure communications method for conveying a message from a sender to an intended recipient, the method comprising:
 establishing a shared secret random cryptographic key between a sender and a recipient using a quantum communications channel according to a method as described in claim 1;
 using the shared secret key as a one-time pad for secure encryption of the elements of the message at the sender;
 transmitting the encrypted message to the intended recipient using a conventional communications channel; and
 using the shared secret key as a one-time pad for secure decryption of the encrypted elements of the message at the recipient.

26. A method of a sender establishing a secret random cryptographic key shared with a recipient using a quantum communications channel, the method comprising:
 generating a plurality of random quantum states of a quantum entity, each random state being defined by a randomly selected one of a first plurality of bases in Hilbert space, the first plurality of bases being randomly and independently chosen from a uniform distribution of all pure quantum states in Hilbert space;
 transmitting the plurality of random quantum states of the quantum entity via the quantum channel to the recipient;
 transmitting to the recipient composition information describing a subset of the plurality of random quantum states;
 deriving a first binary string from the transmitted plurality of quantum states not in the subset; and
 using error correction techniques to establish the shared secret random cryptographic key from the first binary string.

27. A method according to claim 26, wherein the first plurality of bases in Hilbert space comprises at least four random bases.

28. A method according to claim 26, wherein the selecting step comprises generating and measuring a first plurality of bases in two-dimensional Hilbert space.

29. A method according to claim 26, wherein the selecting step comprises generating and measuring a first plurality of bases in a real subspace of two-dimensional Hilbert space.

30. A method according to claim 26, wherein the composition information transmitting step comprises transmitting information describing the bases of the subset of the plurality of random quantum states.

31. A method according to claim 26, wherein the subset information transmitting step comprises transmitting the subset information over a public channel, such as a radio channel.

32. A method according to claim 26, wherein the quantum entity is photons and the quantum states are degrees of polarisation of the photons.

33. A method according to claim 26, wherein the first plurality of bases is selected randomly.

34. A method according to claim 26, wherein the step of using error correction techniques comprises using several quantum states to generate a single bit of the shared secret key at the sender.

35. A method of a recipient establishing a secret random cryptographic key shared with a sender using a quantum communications channel, the method comprising:
 receiving a plurality of random quantum states of a quantum entity via the quantum channel from the sender;
 measuring the quantum state of each of the received quantum states of the quantum entity with respect to a randomly selected one of a recipient's plurality of bases in Hilbert space, the second plurality of bases being randomly and independently chosen from a uniform distribution of all pure quantum states in Hilbert space;
 receiving from the sender composition information describing a subset of the plurality of random quantum states;
 analysing the received composition information and the measured quantum states corresponding to the subset to derive a first statistical distribution describing the subset of transmitted quantum states and a second statistical distribution describing the corresponding measured quantum states;

establishing the level of confidence in the validity of the plurality of transmitted random quantum states by verifying that the first and second statistical distributions are sufficiently similar;

deriving a recipient binary string from the received plurality of quantum states not in the subset; and using error correction techniques to establish the shared secret random cryptographic key from the recipient binary string.

36. A method according to claim 35, wherein the recipient's plurality of bases in Hilbert space comprises at least four random bases.

37. A method according to claim 35, wherein the analysing step comprises analysing the information describing the bases to derive the first statistical distribution.

38. A method according to claim 35, wherein the establishing step comprises determining a statistical error rate.

39. A method according to claim 35, wherein the establishing step comprises:

determining the degree of difference between the first and second statistical distributions; and accepting the security of the channel if the degree of correlation between the two distributions is greater than a threshold level.

40. A method according to claim 39, further comprising selecting the value of the threshold level.

41. A method according to claim 35, wherein the deriving step comprises transmitting information to the recipient representing the bases for the quantum states not in the subset which make up the first binary string.

42. A method according to claim 35, wherein the carrying out the reconciliation step comprises using privacy amplification techniques.

43. A method according to claim 35, wherein the quantum entity is photons and the quantum states are degrees of polarisation of the photons.

44. A method according to claim 35, further comprising temporarily storing the received quantum states of the quantum entity prior to carrying out the measuring step.

45. A method according to claim 44, wherein the measuring step is carried out after the temporary storing step and uses the received recipient composition information to determine some of the bases of the second plurality of bases.

46. A method according to claim 35, wherein the recipient's plurality of bases is selected randomly.

47. A method according to claim 35, further comprising the recipient transmitting some information about the bases chosen for measurement and/or the measurement results to the sender.

48. A method according to claim 35, wherein the step of using error correction techniques comprises using several quantum states to generate a single bit of the shared secret key at the recipient.

49. A method according to claim 35, further comprising transmitting data regarding the second statistical distribution from the recipient to the sender.

* * * * *

UNITED STATES PATENT AND TRADEMARK OFFICE
CERTIFICATE OF CORRECTION

| | | |
|---|---|---|
| PATENT NO. | : 7,983,422 B2 | Page 1 of 1 |
| APPLICATION NO. | : 10/627158 | |
| DATED | : July 19, 2011 | |
| INVENTOR(S) | : Adrian Patrick Kent et al. | |

It is certified that error appears in the above-identified patent and that said Letters Patent is hereby corrected as shown below:

In column 16, line 9, in Claim 1, delete "defied" and insert -- defined --, therefor.

Signed and Sealed this
Twentieth Day of March, 2012

David J. Kappos
*Director of the United States Patent and Trademark Office*